United States Patent [19]

Parsons

[11] Patent Number: 5,191,805

[45] Date of Patent: Mar. 9, 1993

[54] ANTI-FRICTION NUT

[75] Inventor: John D. Parsons, Bethel, Conn.

[73] Assignee: Norco, Inc., Ridgefield, Conn.

[21] Appl. No.: 818,886

[22] Filed: Jan. 10, 1992

[51] Int. Cl.[5] .............................................. F16H 55/17
[52] U.S. Cl. .................................. 74/459; 74/424.8 R
[58] Field of Search ...................... 74/57, 424.8 R, 459

[56] References Cited

U.S. PATENT DOCUMENTS

| 3,766,788 | 10/1973 | Metz | 74/459 X |
| 4,008,625 | 2/1977 | Malhotra | 74/459 X |
| 4,198,872 | 4/1980 | Metz | 74/57 |

FOREIGN PATENT DOCUMENTS

| 526586 | 7/1921 | France | 74/459 |
| 1044 | 1/1906 | United Kingdom | 74/459 |

Primary Examiner—Allan D. Herrmann
Assistant Examiner—David W. Laub
Attorney, Agent, or Firm—H. Gibner Lehmann; K. Gibner Lehmann

[57] ABSTRACT

A light-weight miniature, high-speed, light-load anti-friction nut assemblage adapted to receive a screw. The assemblage has a nut body with an axial bore through which the screw can pass, and a second bore extending transversely of its axis and intersecting the axial bore. There is a roller pin disposed in the second bore, having a nose adapted for engagement with side walls of the screw thread. The roller pin is carried on a first miniature anti-friction bearing having inner and outer races, with adhesive being applied between the inner race and the roller pin, and between the outer race and the walls of the second bore. A second miniature anti-friction bearing is carried in a recess in the axial bore of the nut body, this second bearing centralizing the nut body on the screw for relative turning with respect thereto. Reduced component count and significant manufacturing economies are realized.

8 Claims, 1 Drawing Sheet

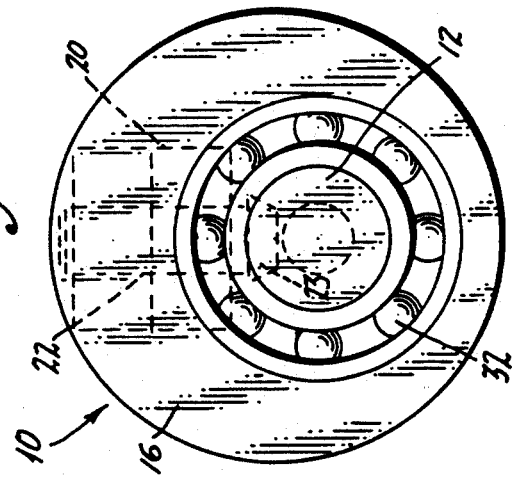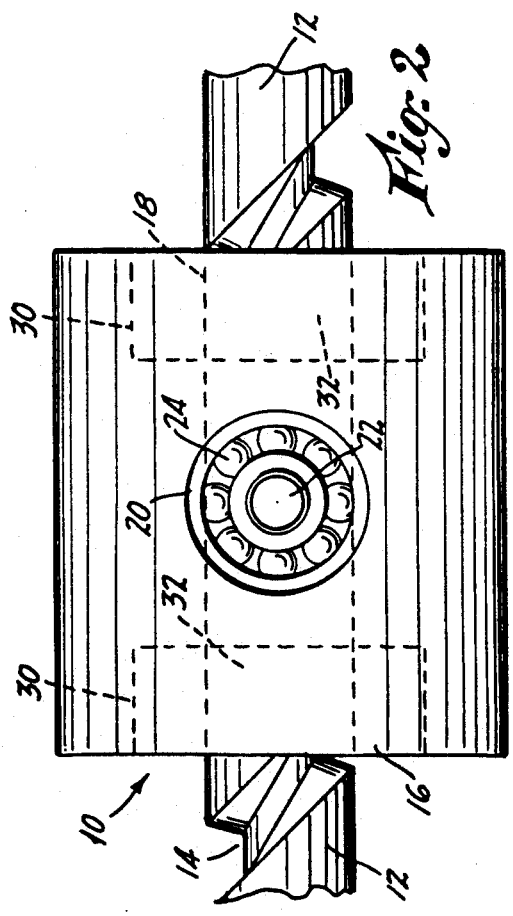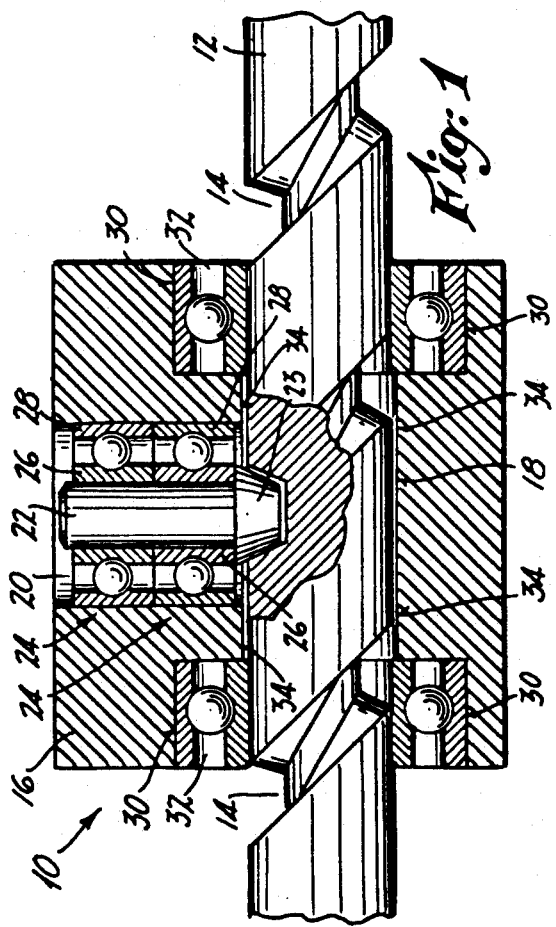

ANTI-FRICTION NUT

Research and development of the present invention and application have not been Federally-sponsored, and no rights are given under any Federal program.

BACKGROUND OF THE INVENTION

1. Field of the Invention

This invention relates generally to low-friction nut constructions, and more particularly to improvements in the devices described and illustrated in U.S. Pat. No. 3,296,880 dated Jan. 10, 1967, issued to A. Maroth, and entitled RADIAL ROLLER ANTI-FRICTION TRANSMISSION.

2. Description of the Related Art Including Information Disclosed Under 37 CFR §§1.97-1.99

The above identified patent discloses a number of low-friction nut followers adapted for engagement with elongate screws of one type or another, or with splines. As generally shown in FIG. 8 of the patent, in such devices there is provided a nut body having radially extending holes which accept a series of rollers that engage the threads of a screw passing through the nut bore. Each roller (70) is turnably carried in a needle bearing (48). The rollers preferably are backed up by washer-like thrust ball bearings (50), which latter are held in position by disc-like threaded plugs (60a) screwed into the radial holes of the nut body.

Alternate constructions are illustrated in FIG. 7, showing a modified thrust bearing comprising a cage (54) and balls (52); and FIG. 9, which illustrates an arrangement where springs (83, 85) are employed between the threaded plugs and the roller elements (78, 82), in order to bias the latter inwardly and thereby tend to adjust the load on each element.

Other roller-carrying drive nuts are shown in U.S. Pat. No. 3,779,094 dated Dec. 18, 1973, issued to B. LaBarre, and entitled REVERSING NUT FOR A DIAMOND THREAD SCREW; and U.S. Pat. No. 3,792,616 dated Feb. 19, 1974, issued to M. Wentzel, and entitled RECIPROCATING DRIVE. In U.S. Pat. No. '616, radially disposed rollers are carried by means of bushings (40). Each roller has a pair of needle bearings and an end thrust bearing, together with a pair of back-to-back springs (36) which normally bias the rollers forward into engagement with the screw threads, but which can yield outwardly an extent in the event a particular roller experiences an excessive radially outward force. The end result was a tendency for the springs to equalize the forces applied to each roller. In the disclosed device the nut was employed with a screw shaft having a pair of aligned closed loop-like grooves in which the rollers were received, so that the resulting motion of the nut was to reciprocate as the shaft was turned.

U.S. Pat. No. '094 discloses a reversing nut construction having a nut body with radially extending holes in which there is received a series of radially extending rollers, for engagement with the threads of a diamond thread shaft. Again, there are employed radial bushings as housings for the respective rollers, and a pair of needle bearings is interposed between each roller and the wall of its bushing. Thrust bearings are located at the outermost end of each roller.

Still other types of nut follower devices are disclosed in U.S. Pat. No. 4,031,765, dated Jun. 28, 1977, issued to R. Metz, and entitled REVERSING NUT FOR A DIAMOND THREAD SCREW; and U.S. Pat. No. 4,198,872, dated Apr. 22, 1980, issued to R. Metz, and entitled MECHANICAL SCREW TRANSMISSION. The latter two patents employed balls as roller elements between a nut body and suitably threaded shaft. U.S. Pat. No. '765 utilized spring rings (75, 76) to restrain the balls and bias them into engagement with the screw threads. U.S. Pat. No. '872 shows a bowed spring retainer washer (46) to bias each ball-carrying bushing in a radially inward direction.

In all of the disclosed devices provision was made to permit limited radially inward/outward shifting of the balls/roller elements as dictated by different requirement of absolute load on the nut body, and of relative changes in load between the balls/rollers, in an effort to equalize or share the load. The disclosed constructions had the advantage that slight inconsistencies in the thread pitch from one point to another could be accommodated as a consequence of the ability of the balls/rollers to move inwardly or outwardly.

In spite of considerable commercial success of several of the devices noted above, it has been felt that there was some room for improvement in manufacturing and assembly procedure, as well as reduction in costs involved therewith.

In particular, the device disclosed in FIG. 8 of U.S. Pat. No. '880 was rather expensive to manufacture and produce, due to the relatively large number of separate components involved, namely a roller, a needle bearing, thrust washer (74), a thrust bearing (50), and threaded retainer plug (60a). Further, the adjustment of each plug in order to establish a predetermined, desired radial position of each roller was often difficult to accomplish in practice. Adjustment of one plug and roller often upset prior adjustments to the others, rendering an absolute "balance" condition of each roller extremely difficult to achieve. As a result, in the practice of the invention, one or several rollers often carried more than their relative share of the load. The large number of individual parts, coupled with the likelihood to have to resort largely on manual assembly and adjustment, made the devices fairly expensive and time-consuming to produce on a large scale.

A further consideration was the fact that the tolerances of the needle bearings which were available were generally poor, and hence the need arose for spring-biasing of the rollers in order to compensate for such poor tolerances.

SUMMARY OF THE INVENTION

The above disadvantages and drawbacks of prior roller/ball type nut followers are largely obviated by the present invention which has for one object the provision of a novel and improved, miniature, low-friction nut assembly which is extremely simple in its structure, and which provides highly satisfactory results in operation and use, even over prolonged periods of time.

A related object of the invention is to provide an improved low-friction nut assembly as above set forth, which can be assembled with a minimum of time and effort, and with little adjustment being required.

Still another object of the invention is to provide an improved low-friction nut assembly of the kind indicated, wherein manufacturing cost is substantially reduced as a consequence of the reduced number of individual parts required.

Yet another object of the invention is to provide an improved low-friction nut assembly as above characterized wherein the radial thrust forces applied to the roller are effectively accommodated by simple ball bearings, as opposed to needle bearings, the ball bearings being available with considerably improved tolerances on the order of tenths of a mil.

A still further object of the invention is to provide an improved low-friction nut assembly as above characterized, wherein considerable manufacturing economies are realized over the devices of the prior art, as a consequence of greatly simplified assembly procedures.

In accomplishing the above objects the invention provides a light-weight miniature, high-speed, light-load anti-friction nut assemblage adapted to receive a screw, comprising a nut body having an axial bore through which the screw can pass, and having a second bore extending transversely of its axis and intersecting the axial bore. The second bore has a substantially smooth and uninterrupted surface, devoid of projections. There is a roller pin disposed in the second bore, having a nose adapted for engagement with side walls of the screw thread. The roller pin is carried on a first miniature anti-friction bearing having inner and outer races, with adhesive being applied between the inner race and the roller pin and between the outer race and the walls of the second bore. There is further provided a second miniature anti-friction bearing disposed in an annular recess in the axial bore of the nut body, which centralizes the nut body on the screw for relative turning with respect thereto. This second anti-friction bearing has inner and outer races, and adhesive is applied between the outer race of this second antifriction bearing and the walls of the recess in the nut body, so as to retain the bearing captive in the nut body.

The arrangement is such that the bearing for the roller pin can be readily applied thereto with resinous adhesive material, such as that sold under the registered trademark "Loctite", and thereafter such assemblage can be inserted into the second or radial bore of the nut, again with adhesive applied to hold the outer race of the bearing rigid with the walls of the second bore. The position of the roller pin and bearing are prior to the setting of the adhesive, manually positioned so that the nose of the roller pin is a predetermined distance from the root of the screw, and the adhesive is then allowed to dry. The relatively tight tolerances provided by the precision ball bearings, typically, an I. D. tolerance of +0.0000 inch, −0.0002 inch, permits a precise positioning of the roller pin, resulting in reliable, accurate and jam-free operation of the device over extended periods of use. To the surprise of the inventor, the ball bearing associated with the roller pin is capable of countering both transverse and axial thrust forces applied by the screw to the roller pin, and there is thus eliminated the requirement of a separate thrust bearing or spring at the head of the roller, as was needed in just about all prior designs.

Extreme simplicity of design and manufacturing economy are thereby realized, with little or no sacrifice in performance or efficiency of operation.

Other features and advantages will hereinafter appear.

BRIEF DESCRIPTION OF THE DRAWINGS

FIG. 1 is an axial section of the improved nut assembly of the invention, shown with a single roller carried in a radial bore of the nut body by means of dual ball bearings, inner and outer.

FIG. 2 is a top plan view of the nut assembly and screw of FIG. 1, and

FIG. 3 is a right side elevation of the nut assembly and screw of FIGS. 1 and 2.

DESCRIPTION OF THE PREFERRED EMBODIMENT

Referring to the figures there is illustrated an anti-friction nut assemblage generally designated by the numeral 10 and adapted for use with a screw 12 having a thread groove 14. The nut assemblage 10 comprises a nut body 16 having an axial bore 18 through which the screw 12 passes, and having a second bore 20 disposed radially, or transversely of the nut body bore 18.

Disposed in the radial bore 20 is a roller pin 22 having a nose 23 extending into the thread groove 14, for engagement with the walls of the groove.

In accordance with the present invention there are provided adhesive-secured or anchored means including anti-friction bearings for mounting the roller 22, such bearings in the present instance comprising two precision ball bearings 24 having inner races 26 and outer races 28. The roller pin 22 is secured to the inner race 26 of each bearing by means of adhesive, preferably that known by the trademark, "Loctite", first using Loctite adhesive primer #T-747, followed by Loctite adhesive #262.

Further, by the invention, following the application of adhesive between the inner races 26 and the roller pin 22, an application of the same adhesive is applied to the outer races 28, and to the walls of the radial bore 20, and the assemblage consisting of the roller pin 22 and bearings 24 is inserted in the radial bore 20 to a predetermined depth which provides a few thousandths of an inch clearance between the end surface of the nose of the roller pin 22 and the root of the screw thread. Due to the smooth wall surface of the bore 20 no interference with the insertion of the roller pin 22 and bearings 24 is encountered; nor is there any interference with adjustment of the radial position of the pin 22 therein.

The opposite ends of the nut body 16 are provided with annular recesses 30, and centralizing ball bearings 32 secured in said recesses 30 by adhesive similar to that employed with the bearings 24. The adhesive is applied to the outer races of bearings 32 and to the walls of the annular recesses 30, following which the bearings 32 are pressed in place. In accordance with the present invention and as seen in FIG. 1, the innermost surfaces of the inner bearing 24 are disposed a greater distance from the axis of the bore 30 than the wall portions of the axial bore 30. This is an important feature of the invention since it minimizes the likelihood of adhesive coming in contact with the screw 12 during the assembly operations, especially if by inadvertence a slight excess of adhesive should be present.

The diameters of the inner races of the bearings 32 are such that there exists a sliding fit with the crest or exposed walls of the screw thread 12. Further, according to the invention, wall portions of the axial bore 30 indicated at 34 which are disposed at locations between the bearings 32 have diametric surfaces which are disposed at a distance from the screw axis which is greater than the inside radius of the inner races of the bearings 32, to prevent adhesive from contacting the screw 12.

For many applications, a single roller pin 22 can be employed. Under such circumstances, the number of components is kept to an absolute minimum, and the use of adhesive for securing the inner and outer races of the bearings to the roller pin and walls of the radial bore has been found to be both highly satisfactory from the standpoint of operation, and economy, since there are eliminated the need for special biasing springs, spring washers, retaining washers, and the like.

It has been determined that following curing of the adhesive, the outer races 28 of the bearings 24 remain securely held in their initial positions, with the inner races 26 being fixed to the roller pin 22 and rotatable therewith.

The present construction has an additional advantage in that the use of needle bearings has been completely eliminated. Instead, physically small, high-precision ball bearings of a readily-available type are employed. The tolerances of the bearings can be held very closely. As an example, the tolerance of the inside diameter of the roller bearings for one application currently being employed, is +0.0000 inch, −0.0002 inch.

It has been discovered that the ball bearings are capable of handling both transverse and thrust loads applied to the nut body 16 by the roller pin 22. Thus, there is also eliminated the need for separate thrust bearings, as were frequently required in prior designs.

Furthermore, the use of a single roller pin eliminates the need to set and re-adjust multiple pins separately, as in the prior art devices, where such successive adjustments were often critical and difficult to achieve in practice.

Manufacturing economy is realized, both by the relatively few number of parts employed, and by the ease with which the parts can be assembled. Surprisingly, the inventor has discovered that use of adhesive, in place of press fits and/or retainer springs/washers, has been found to provide both simplicity and high reliability to the resulting structure.

The disclosed adhesive-secured anti-friction nut assemblage thus constitutes a distinct advance and improvement in the field of mechanical transmissions.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A light-weight miniature, high-speed light-load, anti-friction nut assemblage adapted to receive a grooved member having side walls in the groove thereof, comprising in combination:
   a) a nut body having an axial bore with wall portions through which said grooved member can pass, and having a transverse bore extending entirely through said wall portions and transversely of its axis and intersecting said axial bore, said transverse bore having walls,
   b) a roller pin disposed in said transverse bore, having a nose adapted for engagement with the side walls of the groove of said grooved member,
   c) miniature anti-friction bearing means, mounting said roller pin in said transverse bore, said bearing means having inner and outer races and having innermost and outermost surfaces,
   d) an adhesive securing an inner race of said bearing means to said roller in, and securing an outer race of said bearing means to the walls of said transverse bore,
   e) additional anti-friction bearing means disposed in the axial bore of the nut body, for mounting the nut body on said grooved member for relative turning with respect thereto, said additional anti-friction bearing means having inner and outer races,
   f) said nut body having a recess in its axial bore, forming walls in which recess the additional anti-friction bearing is disposed, and
   g) an adhesive securing an outer race of said additional anti-friction bearing means to the walls of the said recess,
   h) said transverse bore having a substantially cylindrical smooth wall surface devoid of projections.

2. A nut assemblage as set forth in claim 1, wherein: said additional bearing means comprises a pair of rolling type bearings which are located to straddle said miniature bearing means,
   b) wall portions of said axial bore which are disposed at locations between said additional bearing means having a diameter which is greater than the inside diameter of the inner races of the additional bearing means.

3. A nut assemblage as set forth in claim 2, wherein:
   a) said miniature and additional bearing means comprises ball-bearing assemblages.

4. A nut assemblage as set forth in claim 2, wherein:
   a) the innermost surfaces of said miniature bearing means are disposed at a greater distance from the axis of the axial bore of the nut body than the said wall portions of the axial bore.

5. A nut assemblage as set forth in claim 1, wherein:
   a) said miniature bearing means comprises a stacked pair of ball-bearing assemblages.

6. A nut assemblage as set forth in claim 5, wherein:
   a) said adhesive for both said bearing means comprises a synthetic material.

7. A nut assemblage as set forth in claim 5, wherein:
   a) said adhesive for both said bearing means comprises a substance known by the trademark "Loctite".

8. A light-weight miniature, high-spaced light-load, anti-friction nut assemblage adapted to receive a grooved member having side walls in the groove thereof, comprising in combination:
   a) a nut body having an axial bore with wall portions through which said grooved member can pass, and having a transverse bore extending entirely through said wall portions and transversely of its axis and intersecting said axial bore, said transverse bore having wall,
   b) a roller pin disposed in said transverse bore, having a nose adapted for engagement with the side walls of the groove of said grooved member,
   c) miniature anti-friction bearing means, mounting said roller pin in said transverse bore, said bearing means having inner and outer races and having innermost and outermost surfaces,
   d) adhesive retention means for securing an inner race of said bearing means to said roller pin, and for securing an outer race of said bearing means to the walls of said transverse bore, said adhesive retention means enabling initial adjustment of the radial position of the roller pin with respect to the grooved member and subsequent fixing of the position of the said roller pin in an adjusted position, said retention means thereby establishing a predetermined working clearance between said roller pin and grooved member, e) additional anti-friction bearing means disposed in the axial bore of the nut body, for mounting the nut body on said grooved member for relative turning with respect thereto, said additional anti-friction bearing means having inner and outer races, f) said nut body having a recess in its axial bore, forming walls in which recess the additional anti-friction bearing means is disposed, and g) an adhesive securing an outer race of said additional anti-friction bearing means to the walls of the said recess, h) said transverse bore having a substantially cylindrical smooth wall surface devoid of projections.

* * * * *